United States Patent
Sinha et al.

(10) Patent No.: US 10,798,134 B2
(45) Date of Patent: Oct. 6, 2020

(54) INTERNET PROTOCOL (IP) MULTIMEDIA SUBSYSTEM (IMS) BASED SESSION INITIATION PROTOCOL (SIP) CALL SETUP RETRY

(71) Applicant: Charter Communications Operating, LLC, St. Louis, MO (US)

(72) Inventors: Ashutosh Kumar Sinha, Centennial, CO (US); Robert Dianda, Colorado Springs, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 155 days.

(21) Appl. No.: 15/938,399

(22) Filed: Mar. 28, 2018

(65) Prior Publication Data

US 2019/0306202 A1 Oct. 3, 2019

(51) Int. Cl.
*G06F 15/16* (2006.01)
*H04L 29/06* (2006.01)
*H04L 29/12* (2006.01)

(52) U.S. Cl.
CPC ...... *H04L 65/1069* (2013.01); *H04L 61/2007* (2013.01); *H04L 65/1006* (2013.01); *H04L 65/1016* (2013.01); *H04L 65/1046* (2013.01)

(58) Field of Classification Search
CPC ............. H04L 65/1069; H04L 61/2007; H04L 65/1006; H04L 65/1016; H04L 65/1046
USPC ........ 709/227, 228, 223, 203, 220, 224, 239
See application file for complete search history.

(56) References Cited

U.S. PATENT DOCUMENTS

| | | | |
|---|---|---|---|
| 2006/0294211 A1* | 12/2006 | Amato | H04L 45/28 709/220 |
| 2009/0282137 A1* | 11/2009 | Qiu | H04L 67/1008 709/223 |
| 2010/0323725 A1* | 12/2010 | Cai | H04W 4/12 455/466 |
| 2013/0232213 A1* | 9/2013 | Bustamante | H04W 4/21 709/206 |
| 2015/0121123 A1* | 4/2015 | Bath | H04L 63/08 714/4.11 |
| 2015/0282242 A1* | 10/2015 | Merino Vazquez | H04L 65/1073 370/221 |
| 2018/0183655 A1* | 6/2018 | Gupta | H04W 76/27 |

FOREIGN PATENT DOCUMENTS

WO    WO-2014101953 A1 *  7/2014 ......... H04L 65/1016

\* cited by examiner

*Primary Examiner* — Kaylee J Huang
(74) *Attorney, Agent, or Firm* — The Marbury Law Group, PLLC

(57) ABSTRACT

Systems, methods, and devices of the various embodiments disclosed herein may enable automatic retry of Internet Protocol (IP) Multimedia Subsystem (IMS) Based Session Initiation Protocol (SIP) Call Setup. Various embodiments may enable a server in an IMS based telecommunication network, such as a proxy-call session control function (P-CSCF) server, interrogating/serving-call session control function (I/S-CSCF) server, telephony application server (TAS), etc., to reattempt SIP call setup. In various embodiments, in response to receiving a SIP error response including a retry-after header, the server may wait a period of time before sending a new SIP invite message.

21 Claims, 9 Drawing Sheets

INTERNET PROTOCOL (IP) MULTIMEDIA SUBSYSTEM (IMS) BASED SESSION INITIATION PROTOCOL (SIP) CALL SETUP RETRY

BACKGROUND

In conventional Internet Protocol (IP) Multimedia Subsystem (IMS) based telecommunication networks (such as fixed line networks, Voice Over Wi-Fi (VoWifi) networks, Voice Over Long Term Evolution (LTE) (VoLTE) networks, etc.), Session Initiation Protocol (SIP) call setups may be disconnected abruptly due to one or more errors that may occur in the networks. Conventional IMS based telecommunication networks do not support reattempting disconnected SIP call setups. As such, when a SIP call setup is disconnected in conventional IMS based telecommunication networks, the attempted call is terminated and a user is required to manually redial a new call resulting in a new SIP call setup being generated.

SUMMARY

The systems, methods, and devices of the various embodiments disclosed herein may enable automatic retry of Internet Protocol (IP) Multimedia Subsystem (IMS) based Session Initiation Protocol (SIP) call setup. Various embodiments may enable a server in an IMS based telecommunication network, such as a proxy-call session control function (P-CSCF) server, interrogating/serving-call session control function (I/S-CSCF) server, telephony application server (TAS), etc., to reattempt SIP call setup. In various embodiments, in response to receiving a SIP error response including a retry-after header, the server may wait a period of time before sending a new SIP invite message. In various embodiments, the period of time may correspond to a period to wait before retrying a SIP invite message defined in the retry-after header. In various embodiments, the period of time may correspond to a retry time. In various embodiments, the new SIP invite message may be generated based at least in part on information associated with an originally received SIP invite message stored in a memory. In various embodiments, the information associated with the originally received SIP invite message may include Session Description Protocol (SDP) information.

Various embodiments may provide a method to automatically retry SIP call setup in an IMS based telecommunication network, the method may include sending a SIP invite message generated by a call originating computing device to a next computing device, receiving a first SIP error message from the next computing device including a retry-after header indicating a retry-after value, storing information associated with the SIP invite message in a memory in response to receiving the first SIP error message from the next computing device including the retry-after header indicating the retry-after value, determining whether a SIP retry timer is greater than or equal to the retry-after value in response to storing the information associated with the SIP invite message in a memory, generating a new SIP invite message based at least in part on the information associated with the SIP invite message in the memory in response to determining that the SIP retry timer is greater than or equal to the retry-after value, and sending the new SIP invite message to the next computing device. In various embodiments, the method may further include continuing call setup with the next computing device in response to sending the new SIP invite message. In some embodiments, the information associated with the SIP invite message may include SDP information. In some embodiments, the retry-after value may be a period of seconds, such as from 1 second to 65535 seconds. Various embodiments may further include blocking routing of calls to the next computing device until determining that the SIP retry timer is greater than or equal to the retry-after value. Various embodiments may further include determining whether an alternate computing device is available to receive the SIP invite message in response to receiving the first SIP error message from the next computing device including the retry-after header indicating the retry-after value, and sending the SIP invite message to the alternate computing device in response to determining that the alternate computing device is available to receive the SIP invite message. Various embodiments may further include receiving a second SIP error message from the alternate computing device and storing the information associated with the SIP invite message in the memory in response to receiving the first SIP error message from the next computing device including the retry-after header indicating the retry-after value and receiving the second SIP error message from the alternate computing device. Various embodiments may further include determining whether the SIP retry timer is greater than or equal to a default retry-time in response to storing the information associated with the SIP invite message in the memory, and generating the new SIP invite message based at least in part on the information associated with the SIP invite message in the memory in response to determining that the SIP retry timer is greater than or equal to the retry-after value or the SIP retry time is greater than or equal to the default retry-time. In some embodiments, the default retry-time may be 10 seconds.

Further embodiments disclosed herein include a computing device having a processor configured with processor-executable instructions to perform operations of the methods summarized above. Further embodiments disclosed herein include a computing device including means for performing functions of the methods summarized above. Further embodiments disclosed herein include a non-transitory processor-readable storage medium having stored thereon processor-executable instructions configured to cause a computing device processor to perform operations of the methods summarized above. Further embodiments disclosed herein include a server configured with processor executable instructions to perform operations of the methods summarized above. Further embodiments disclosed herein include a server including means for performing functions of the methods summarized above. Further embodiments disclosed herein include a non-transitory processor-readable storage medium having stored thereon processor-executable instructions configured to cause a server processor to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
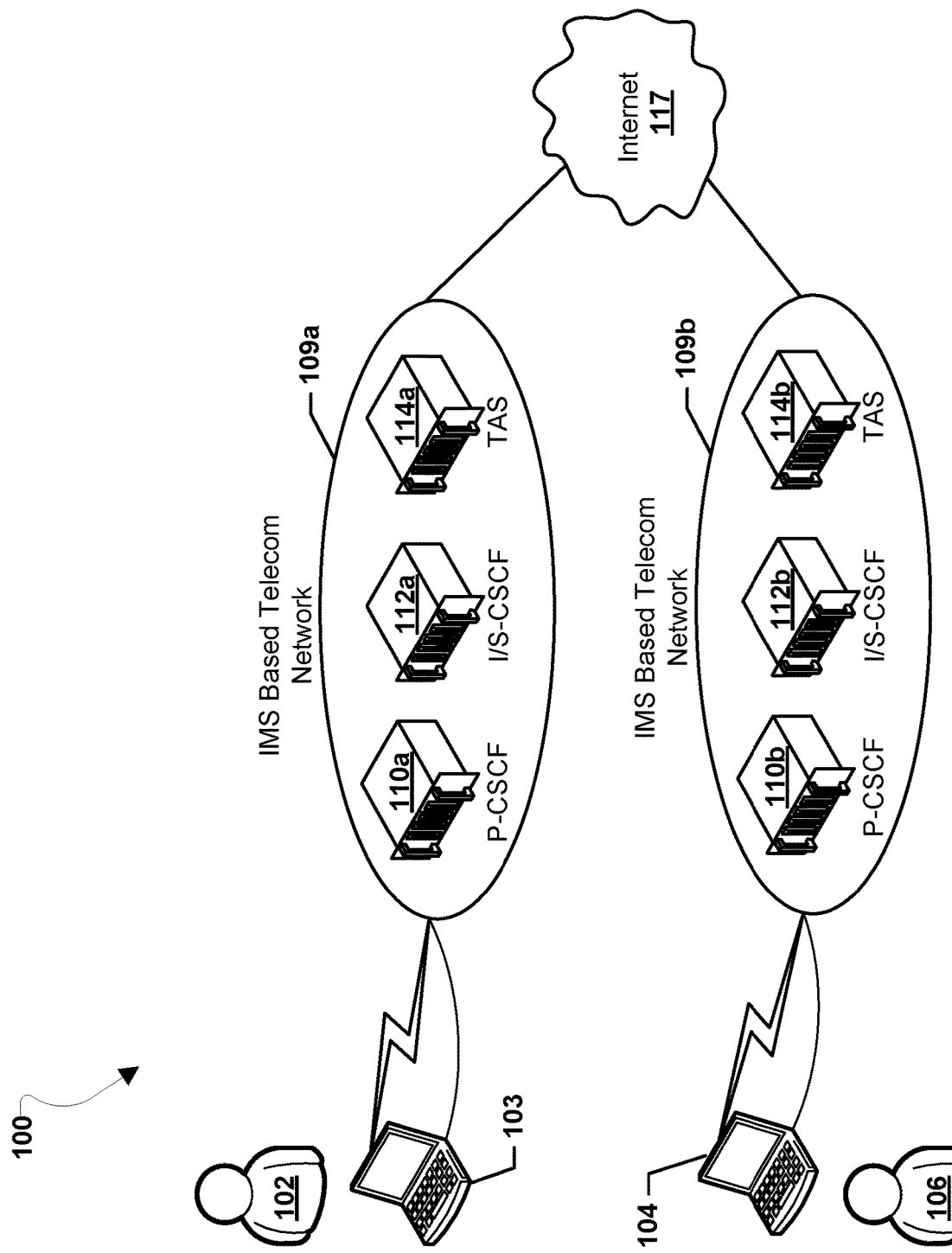
FIG. 1 is a communication system block diagram of an Internet Protocol (IP) network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "computing device" is used to refer to any one or all of satellite or cable set top boxes, laptop computers, rack mounted computers, routers, cable modem termination systems (CMTSs), cellular telephones, smart phones, personal or mobile multi-media players, personal data assistants (PDAs), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

The systems, methods, and devices of the various embodiments disclosed herein may enable automatic retry of Internet Protocol (IP) Multimedia Subsystem (IMS) based Session Initiation Protocol (SIP) call setup. Various embodiments may enable a server in an IMS based telecommunication network, such as a proxy-call session control function (P-CSCF) server, interrogating/serving-call session control function (I/S-CSCF) server, telephony application server (TAS), etc., to reattempt SIP call setup. Various embodiments may enable such servers in IMS based telecommunication networks (e.g., fixed line networks, Voice Over Wi-Fi (VoWifi) networks, Voice Over Long Term Evolution (LTE) (VoLTE) networks, etc.) to retry SIP call setup in response to SIP call setup getting disconnected, such as due to one or more network error scenarios. In this manner, the various embodiments may enable serves in IMS based telecommunication networks to retry call setups again on their own in case of failure without user intervention.

Various embodiments may enable a server, such as P-CSCF server, I/S-CSCF server, TAS, etc., to react when receiving a retry-after header in one or more SIP error responses, such as SIP error messages received after a SIP Invite message has been sent. As examples, SIP error messages including retry-after headers may include "480 Temporarily Unavailable" messages, "486 Busy Here" messages, "500 Server Internal Error" messages, "503 Service Unavailable" messages, "600 Busy Everywhere" messages, "603 Decline" messages, etc. In various embodiments, the SIP error messages may be configurable in the server generating the SIP error message, such as the P-CSCF server, the I/S-CSCF server, the TAS, etc. In various embodiments, the retry-after header may include an indication of a period to wait before retrying a SIP invite message, i.e., a retry-after value. In various embodiments, the retry-after value may be a number of seconds and may range from 1 to 65535 second. In various embodiments, the retry-after value may be different for different type errors and/or different type SIP error messages and the server generating the SIP error message, such as the P-CSCF server, the I/S-CSCF server, the TAS, etc., may select the retry-after value based on the type of error and/or SIP error message generated and/or based on other selection criteria.

In various embodiments, in response to receiving a SIP error response including a retry-after header, a server, such as P-CSCF server, I/S-CSCF server, TAS, etc., may wait a period of time before sending a new SIP invite message. In various embodiments, the period of time before sending a new SIP invite message may correspond to a period to wait before retrying a SIP invite message defined in the retry-after header, i.e., a retry-after value. In various embodiments, the period to wait before retrying a SIP invite message defined in the retry-after header, i.e., the retry-after value, may be a configurable parameter selected by the server generating the SIP error message, such as the P-CSCF server, the I/S-CSCF server, the TAS, etc. In various embodiments, the retry-after value may be a number of seconds and may range from 1 to 65535 seconds. In various embodiments, the period of time before sending a new SIP invite message may correspond to a retry time defined at the computing device receiving the SIP error response, i.e., a default retry-time. The default retry-time may be a configurable value and the default retry-time may be independent of the retry-after value. In various embodiments, the default retry-time may be a period of seconds, such as ten seconds.

In various embodiments, in response to receiving a SIP error response including a retry-after header and while waiting a period of time before sending a new SIP invite message, a server, such as a P-CSCF server, a I/S-CSCF server, a TAS, etc., may not route current or subsequent calls to the server that generated the SIP error message, such as a P-CSCF server, an I/S-CSCF server, a TAS, etc. In various embodiments, while waiting the period of time before sending the new SIP invite message and while waiting a period of time before sending a new SIP invite message, the server, such as the P-CSCF server, the I/S-CSCF server, the TAS, etc., may store information associated with the originally received SIP invite message in a memory available to that server. In various embodiments, the information associated with the originally received SIP invite message may include Session Description Protocol (SDP) information and/or any other information that may enable generation of a new SIP invite message. In various embodiments, the stored information associated with the originally received SIP invite message may be information suitable to enable the generation of a new SIP invite message that may achieve setup of the same call attempted with the originally received SIP invite message. In this manner, the stored information may be call setup information that may enable the generation of a new SIP invite message that may be a substitute for the originally received SIP invite message.

In various embodiments, in response to receiving a SIP error response including a retry-after header and while waiting a period of time before sending a new SIP invite message, a server, such as a P-CSCF server, an I/S-CSCF server, a TAS, etc., may determine whether any alternate routes for sending the originally received SIP invite message may be available. In response to determining that there are not alternate routes available, the server may continue to wait a period of time before sending a new SIP invite message. In response to determining that one or more alternate routes are available, the server may send the originally received SIP invite message along the alternate routes. As one specific example, an IMS based telecommunication network may include two or more TASs that may support SIP call setup and the I/S-CSCF server may attempt to send the originally received SIP invite to a second TAS along a different route in response to receiving a SIP error response including a retry-after header from a first TAS. In response to the sending of the SIP invite to the second TAS being successful, call setup may continue. In response to the sending of the SIP invite to the second TAS resulting in another SIP error message, the I/S-CSCF server may continue to wait a period of time before sending a new SIP invite message.

In various embodiments, in response to a period of time to wait before sending a new SIP invite message having passed (e.g., a timer having met or exceeded a retry-after value, a timer having met or exceeded a default retry-time, etc.), a server, such as a P-CSCF server, an I/S-CSCF server, a TAS, etc., may generate and send a new SIP invite message. In various embodiments, the new SIP invite message may be generated based at least in part on information associated with an originally received SIP invite message stored in a memory, such as an SDP, etc. In this manner, the new SIP invite message may be used to initiate the call and when successful call setup may continue. Thus, in the various embodiments, though the call setup may initially encounter a network error (i.e., the error resulting in the original SIP error message), the call setup may continue based on the new SIP invite message without the attempted call actually being terminated. Accordingly, no a user may not be required to manually redial a new call in response to the initially encountered network error in the various embodiments. In response to receiving a SIP error message after sending the new SIP invite message, the server, such as the P-CSCF server, the I/S-CSCF server, the TAS, etc., may send the received SIP error message to the computing device that sent the originally received SIP invite message. As such, in various embodiments the setup of the originally attempted call may not be actually terminated until after at least two SIP invite attempts (i.e., at least the originally sent SIP invite message and the new SIP invite message) are made by the server, such the P-CSCF server, the I/S-CSCF server, the TAS, etc.

Various examples of different protocols are discussed herein, such as IMS, SIP, SDP, etc. The discussions of specific protocols, such as IMS, SIP, SDP, etc., are provided merely as examples to better illustrate the aspects of the various embodiments, and are not intended to limit the various embodiments in any way. Other protocols may be used with the various embodiments, and the other protocols may be substituted in the various examples without departing from the spirit or scope of the invention.

FIG. 1 illustrates an IP network 100 suitable for use with various embodiments. The IP network 100 may include multiple devices, such as computing devices 103, 104, one or more P-CSCF servers 110, one or more I/S-CSCF servers 112, and one or more TASs 114. Various ones of the one or more P-CSCF servers 110, the one or more I/S-CSCF servers 112, and the one or more TASs 114 may be connected together in various manners to form one or more IMS based networks 109. The one or more P-CSCF servers 110, the one or more I/S-CSCF servers 112, and the one or more TASs 114 in each IMS based telecommunication network 109 may exchange date with one another via their various connections. The computing devices 103, 104 may exchange data via one or more wired or wireless connections with the one or more IMS based telecommunication networks 109. The one or more wired or wireless connections may be established via various networking devices associated with the computing devices 103, 104, such as modems, routers, etc., enabling the computing devices 103, 104 to connect to and exchange data with the one or more IMS based telecommunication networks 109. The one or more IMS based telecommunication networks 109 may connect to the Internet 117 and may exchange data with one another via their respective connections to the Internet 117. In this manner, via the connections to one another and/or the Internet 117 illustrated in FIG. 1 and/or via other connections (not shown), the computing devices 103, 104, the one or more P-CSCF servers 110, the one or more I/S-CSCF servers 112, the one or more TASs 114, and/or other devices of the one or more IMS based telecommunication networks 109 may exchange data with one another. For example, the computing devices 103, 104, the one or more P-CSCF servers 110, the one or more I/S-CSCF servers 112, the one or more TASs 114, and/or other devices of the one or more IMS based telecommunication networks 109 may exchange data with one another via the SIP protocol.

As a specific example, computing device 103 operated by user 102 may be connected to IMS based telecommunication network 109a including one or more P-CSCF servers 110a, one or more I/S-CSCF servers 112a, and one or more TASs 114a and computing device 104 operated by user 106 may be connected to IMS based telecommunication network 109b including one or more P-CSCF servers 110b, one or more I/S-CSCF servers 112b, and one or more TASs 114b. Both IMS based telecommunication network 109a and IMS based telecommunication network 109b may be connected to the Internet 117. User 102 may initiate a SIP call via his or her computing device 103 to user 106's computing device 104 and the SIP call may be established via connections between the computing device 103, the IMS based telecommunication network 109a (e.g., via the one or more P-CSCF servers 110a, one or more I/S-CSCF servers 112a, and one or more TASs 114a), the Internet 117, the IMS based telecommunication network 109b (e.g., via the one or more P-CSCF servers 110b, one or more I/S-CSCF servers 112b, and one or more TASs 114*b*), and the computing device 104. For example, user 102 may initiate the SIP call via a VOIP application running on the processor of his or her computing device 103.

Figure 2:
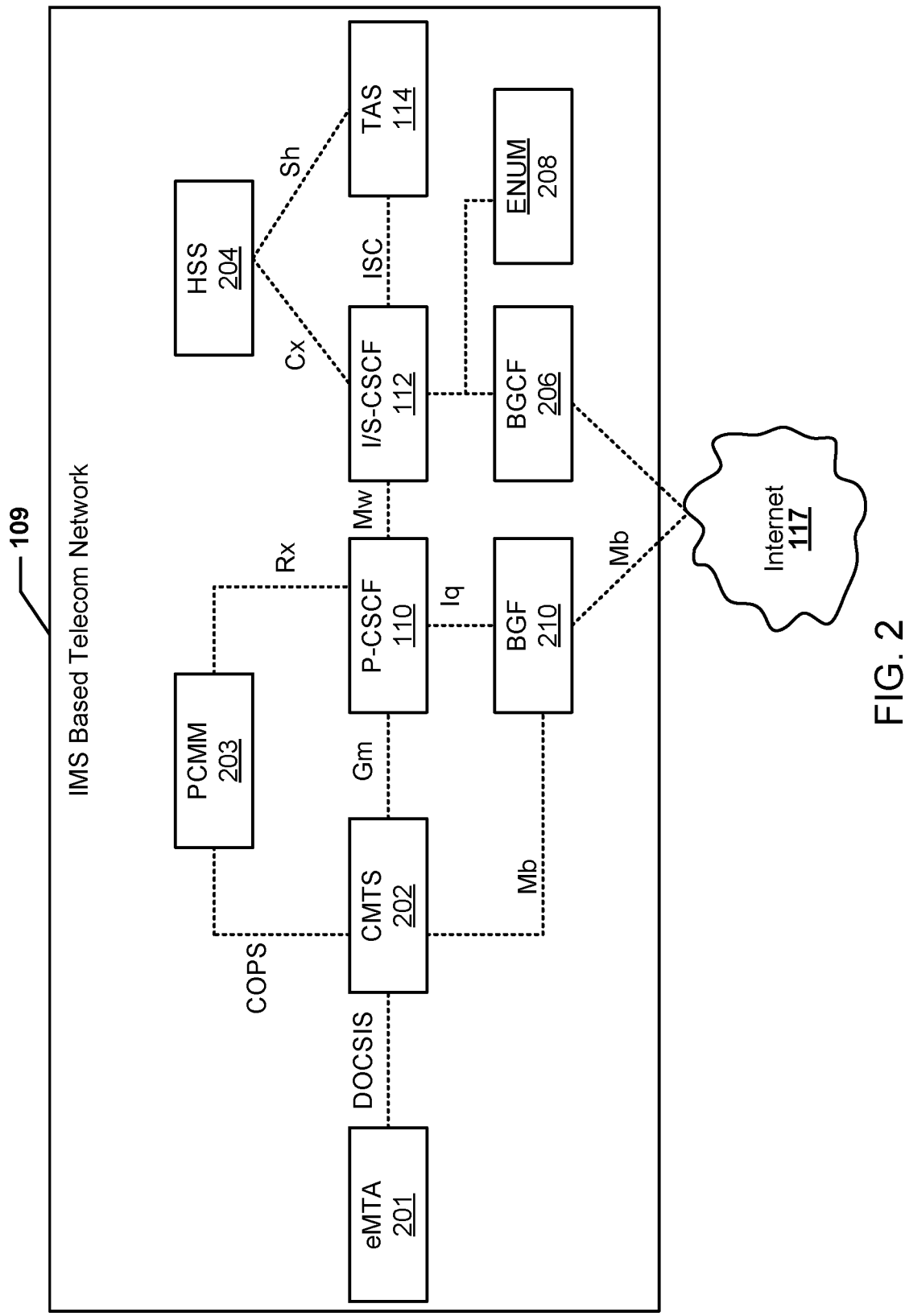
FIG. 2 is a communication system block diagram a fixed line IP Multimedia Subsystem (IMS) based telecommunication network suitable for use with various embodiments.

FIG. 2 illustrates an example configuration of a fixed line IMS based telecommunication network 109 suitable for use with various embodiments. With reference to FIGS. 1 and 2, the IMS based telecommunication network 109 may include an embedded multimedia terminal adapter (eMTA) 201 connected to a cable modem termination system (CMTS) 202. The eMTA 201 may be the IMS based telecommunication network 109 edge device closest to user computing devices connected to the IMS based telecommunication network 109, such as computing devices 103, 104 and may exchange data with the user computing devices, such as computing devices 103, 104, and/or the devices (e.g., modems, routers, etc.) enabling the user computing devices, such as computing devices 103, 104, to connect to the IMS based telecommunication network 109. The eMTA 201 may exchange data with the CMTS 202 according to the Data Over Cable Service Interface Specification (DOCSIS). The eMTA 201 may exchange SIP messages with the CMTS 202 and/or the user computing devices, such as computing devices 103, 104. The CMTS 202 may connect to a packet cable multimedia (PCMM) server 203, a P-CSCF 110, and a boarder gateway function (BGF) server 210. The CMTS 202 may exchange data with the PCMM server 203 via one or more connections established according to the Common Open Policy Service (COPS). The CMTS 202 may exchange data with the BGF server 210 via the media bearer (Mb) interface. The CMTS 202 may exchange data with the P-CSCF 110 via the Gm interface according to the SIP/SDP protocols. The CMTS 202 may send/receive SIP messages to/from the P-CSCF server 110. The PCMM server 203 may be connected to the P-CSCF server 110 and exchange data with the P-CSCF server 110 via the Rx interface. The P-CSCF server 110 may be connected to the BGF server 210 and exchange data with the BGF server 210 via the Iq interface. The BGF server 210 may be connected to the Internet 117 via the Mb interface and may exchange data with the Internet 117 via the Mb interface.

The P-CSCF server 110 may connect to the I/S-CSCF server 112 and exchange data with the I/S-CSCF server 112 via the Mw interface. The P-CSCF server 110 and I/S-CSCF server 112 may send/receive SIP messages to/from one another via the Mw interface. The I/S-CSCF server 112 may be connected to a home subscriber server (HSS) 204, a TAS 114, and a break out gateway control function (BGCF) server 206. The I/S-CSCF server 112 may exchange data with the HSS 204 via the Cx interface. The I/S-CSCF server 112 may exchange data with the TAS 114 via the ISC interface. The I/S-CSCF server 112 and TAS 114 may send/receive SIP messages to/from one another via the ISC interface. The HSS 204 may be connected to the TAS 114 and the HSS 203 and TAS 114 may exchange data via the Sh interface. The I/S-CSCF server 112 may exchange data with the BGCF server 206 which may connect to the Internet 117 and may exchange data with the Internet 117. The BGCF server 206 may be connected to an E.164 number to uniform resource identifier (URI) (ENUM) server 208. The TAS 114 may control the sending/receiving of SIP messages via the Internet 117 to/from other IMS based telecommunication networks 109.

Figure 3:
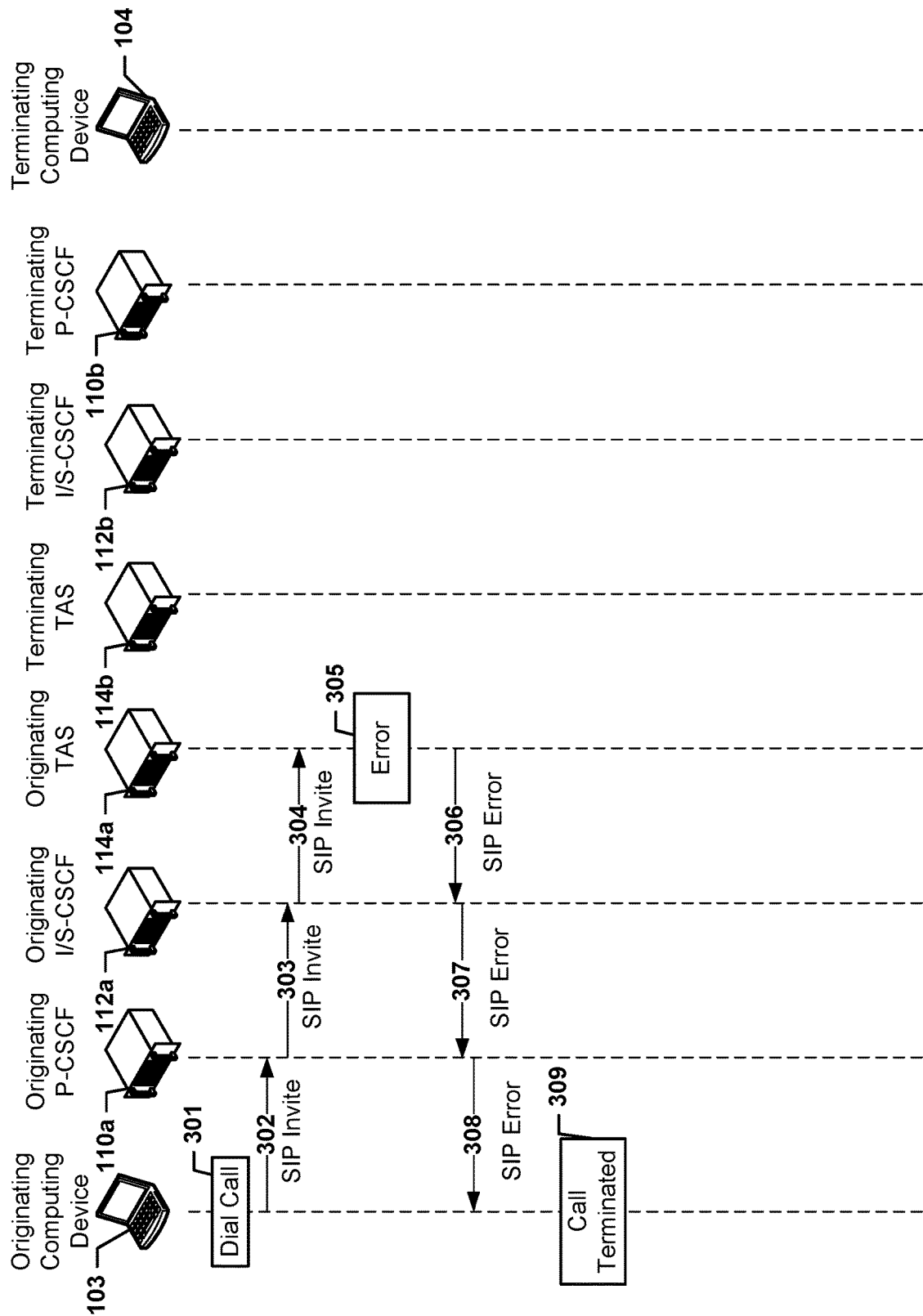
FIG. 3 is a call flow diagram illustrating conventional interactions for attempting SIP call setup in an IP network.

FIG. 3 is a call flow diagram illustrating conventional interactions for attempting SIP call setup in an IP network. The example SIP call setup illustrated in FIG. 3 may be to attempt a call from computing device 103 as the originating computing device (i.e., the dialing device) to computing device 104 as the terminating computing device (i.e., the called device). With reference to FIGS. 1-3, an originating computing device 103 may dial a call, such as in response to a user 102 interaction with the computing device 103 (e.g., a user 102 placing a VOIP call through a VOIP application running on a processor of the computing device 103), in operation 301. The computing device 103 may generate and send a SIP invite message to the P-CSCF 110*a* in the IMS based telecommunication network 109*a* to which the computing device 103 is connected in operation 302. The P-CSCF 110*a* may send the SIP invite message to the I/S-CSCF 112*a* in operation 303. The I/S-CSCF may send the SIP invite message to the TAS 114*a* in operation 304. The TAS 114*a* may determine that a network error occurred at operation 305 preventing the TAS 114*a* from continuing SIP call setup with the TAS 114*b* of the IMS based telecommunication network 109*b* to which the terminating computing device 104 is connected. The error may be any type of network error, such as the network being busy, a server error, a service unavailability, a declined invite, etc. In response to determining the error occurred, the TAS 114*a* may send a SIP error message to the I/S-CSCF 112*a* in operation 306. In response to receiving the SIP error message, the I/S-CSCF 112*a* may send the SIP error message to the P-CSCF 110*a* in operation 307. In response to receiving the SIP error message, the P-CSCF 110*a* may send the SIP error message to the originating computing device 103 in operation 308. In response to receiving the SIP error message, the originating computing device may terminate the call in operation 309. In this manner, the occurrence of the error in operation 305 may result in the call being terminated without any automatic retry of the call in response to the error by the P-CSCF 110*a*, I/S-CSCF 112*a*, and/or TAS 114*a*.

Figure 4:
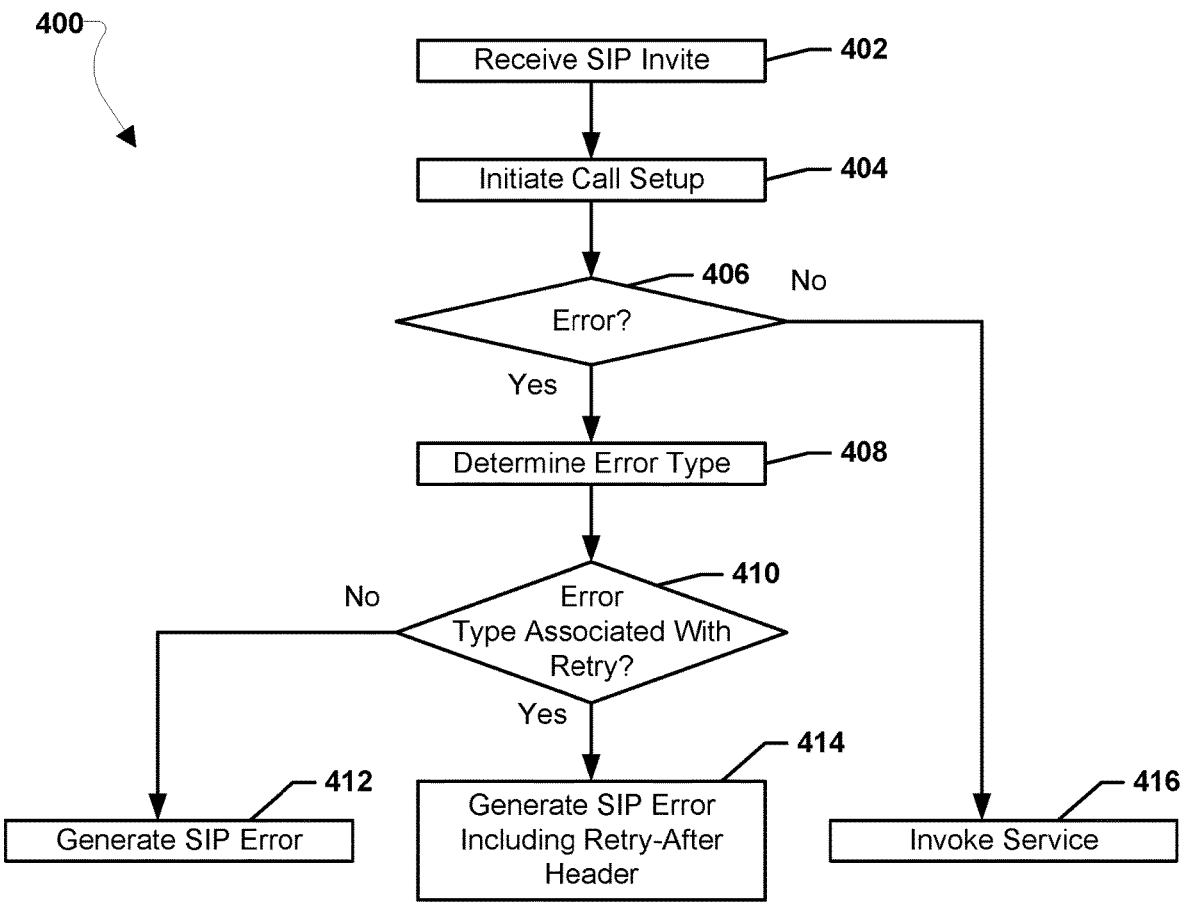
FIG. 4 is a process flow diagram illustrating an embodiment method for generating SIP error messages.

FIG. 4 is a process flow diagram illustrating an embodiment method 400 for generating SIP error messages. In various embodiments, the operations of method 400 may be performed by a processor of a server in an IMS based telecommunication network 109, such as a P-CSCF server 110, a I/S-CSCF server 112, and/or a TAS 114.

With reference to FIGS. 1-4, in block 402 the server may receive a SIP invite message. In various embodiments, the SIP invite may be received from another computing device in the IMS based telecommunication network 109. For example, the SIP invite message may have been generated in response to a user 102 placing a VOIP call through a VOIP application running on a processor of the computing device 103.

In block 404 the server may initiate call setup. In various embodiments, the server may initiate call setup by sending the SIP invite message by routing it to the address of the next computing device needed to establish the attempted call. For example, a P-CSCF server 110 may send the SIP invite message to a connected I/S-CSCF server 112. As another example, an I/S-CSCF server 112 may send the SIP invite message to a connected TAS 114. As a further example, a TAS 114 may send the SIP invite message to a TAS 114 of another IMS based telecommunication network 109 to which the terminating computing device, such as computing device 104, is connected. The SIP invite message may be sent to the various devices to attempt SIP call setup.

In determination block 406, the server may determine whether an error occurred. Errors may occur in networks during call setup for various reasons. As examples, errors may occur because the network is busy, a server error occurred, a service is unavailable, an invite is declined, etc.

In some embodiments, errors may be determined to have occurred based on error messages being received, such as an error message sent from a TAS 114 of the terminating IMS based telecommunication network 109 to the TAS 114 of the originating IMS based telecommunication network 109. In some embodiments, errors may be determined to have occurred based on no response being received in response to attempting to initiate call setup. In response to determining that no error occurred (i.e., determination block 406="No"), the server may invoke the service or otherwise continue call setup in block 416. In this manner, the call may be setup when errors do not occur.

In response to determining that an error did occur (i.e., determination block 406="Yes"), the server may determine the error type in block 408. Errors may occur for various reasons, and the server may determine the error type based on the reason the error occurred. In various embodiments, the error type may be determined based on the error message received. For example, a temporary type error may be indicated by a temporarily unavailable message, a busy type message may be indicated by a busy message, a server type error may be indicated by a server error message, etc.

In determination block 410, the server may determine whether the error is a type associated with retry. An error associated with retry may be a type of error for which a SIP invite retry may be suitable. In this manner, errors suitable for SIP invite retry may be distinguished from errors in which call termination should occur upon error detection. In various embodiments, the server may store data, such as a data table, associating error types with indications as to whether to retry SIP invites. In response to determining that the error is not associated with retry (i.e., determination block 410="No"), the server may generate a SIP error message in block 412. In various embodiments, as the error is not associated with retry, the SIP error message may not include a retry-after head.

In response to determining that the error is associated with retry (i.e., determination block 414="Yes"), in block 414 the server may generate a SIP error including a retry-after header. In various embodiments, the retry-after header may include an indication of a period to wait before retrying a SIP invite message, i.e., a retry-after value. As examples, SIP error messages including retry-after headers may include "480 Temporarily Unavailable" messages, "486 Busy Here" messages, "500 Server Internal Error" messages, "503 Service Unavailable" messages, "600 Busy Everywhere" messages, "603 Decline" messages, etc. In various embodiments, the SIP error messages may be configurable in the server generating the SIP error message. In various embodiments, the retry-after value may be a number of seconds and may range from 1 to 65535 second. In various embodiments, the retry-after value may be different for different type errors and/or different type SIP error messages and the server generating the SIP error message may select the retry-after value based on the type of error and/or SIP error message generated and/or based on other selection criteria. The generated SIP error message including the retry-after header may be sent to the computing device that sent the originally received SIP invite received in block 402.

Figure 5A:
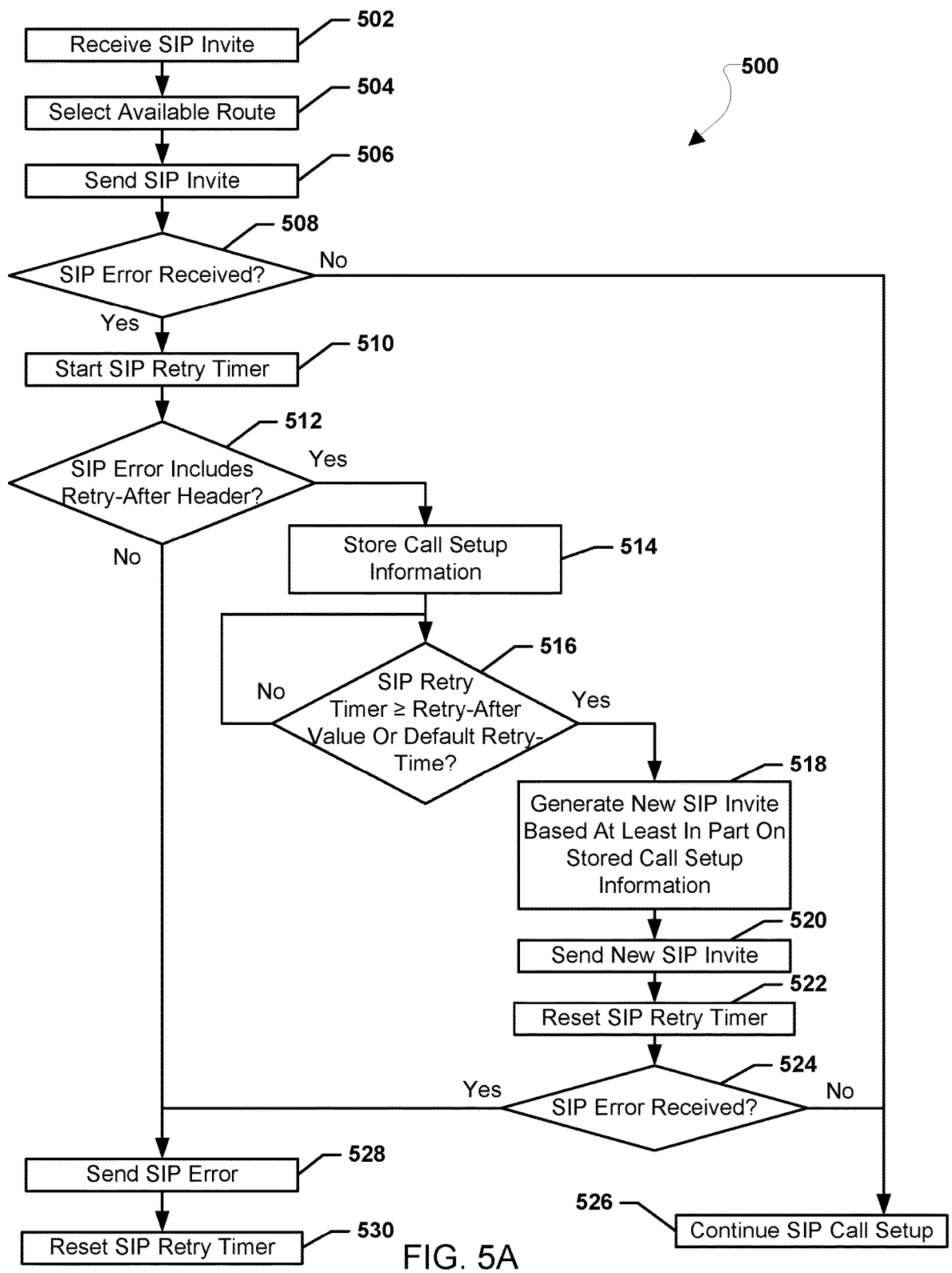
FIG. 5A is a process flow diagram illustrating an embodiment method for automatically retrying IMS based SIP call setup.

FIG. 5A is a process flow diagram illustrating an embodiment method 500 for automatically retrying IMS based SIP call setup. In various embodiments, the operations of method 500 may be performed by a processor of a server in an IMS based telecommunication network 109, such as a P-CSCF server 110, an I/S-CSCF server 112, and/or a TAS 114. In various embodiments, the operations of method 500 may be performed in conjunction with the operations of method 400 (FIG. 4).

With reference to FIGS. 1-5A, in block 502 the server may receive a SIP invite. In various embodiments, the SIP invite may be received from another computing device in the IMS based telecommunication network 109. For example, the SIP invite message may have been generated in response to a user 102 placing a VOIP call through a VOIP application running on a processor of the computing device 103.

In block 504 the server may select an available route. An available route may be a routing path to the next computing device to which the SIP invite may be sent to continue with call setup. For example, a P-CSCF server 110 may select a routing path to a connected I/S-CSCF server 112. As another example, a I/S-CSCF server 112 may select a routing path to a connected TAS 114. As a further example, an originating TAS 114 may select a routing path to a TAS 114 of another IMS based telecommunication network 109 to which the terminating computing device, such as computing device 104, is connected. In an IMS based telecommunication network 109, there may be many different routing paths from a computing device receiving a SIP invite to the next computing device to which the SIP invite may be sent and/or there may be different routing paths to alternative next computing devices to which the SIP invite may be sent.

In block 506 the server may send the SIP invite. For example, a P-CSCF server 110 may send the SIP invite message to a connected I/S-CSCF server 112. As another example, a I/S-CSCF server 112 may send the SIP invite message to a connected TAS 114. As a further example, a TAS 114 may send the SIP invite message to a TAS 114 of another IMS based telecommunication network 109 to which the terminating computing device, such as computing device 104, is connected.

In determination block 508, the server may determine whether a SIP error message is received. SIP error messages may be generated and sent by computing devices in response to network errors occurring preventing call setup. For example, SIP error messages may be generated and sent according to the operations of method 400 described with reference to FIG. 4. In response to determining that no SIP error is received (i.e., determination block 508="No"), the server may continue SIP call setup in block 526.

In response to determining that a SIP error message is received (i.e., determination block 510="Yes"), the server may start a SIP retry time in block 510. The SIP retry time may be a timer that tracks the time waited after the time is started (i.e., after receiving a SIP error message). For example, the SIP retry timer may be a count up timer tracking a number of seconds that have passed since the time was started. Alternatively, the SIP retry timer may be any other type timer, such as a countdown timer, etc.

In determination block 512, the server may determine whether the SIP error message includes a retry-after header. In various embodiments, SIP error messages may include a retry-after header. In various embodiments, the retry-after header may include an indication of a period to wait before retrying a SIP invite message, i.e., a retry-after value. As examples, SIP error messages including retry-after headers may include "480 Temporarily Unavailable" messages, "486 Busy Here" messages, "500 Server Internal Error" messages, "503 Service Unavailable" messages, "600 Busy Everywhere" messages, "603 Decline" messages, etc. In various embodiments, the retry-after value may be a number of seconds and may range from 1 to 65535 second. In various embodiments, the retry-after value may be different for different type errors and/or different type SIP error messages. In various embodiments, a portion of SIP error messages may include retry-after headers and other SIP error messages may not include retry-after headers. In response to determining that the SIP error message does not include a retry-after header (i.e., determination block 512="No"), in block 528, the server may send the SIP error to the next computing device, such as the computing device that sent the originally received SIP invite received in block 502. In block 530 the server may reset the SIP retry timer. In this manner, when the SIP error message does not include a retry-after header, the SIP error message may be sent back to the computing device sending the originally received SIP invite without retrying the SIP invite.

In response to determining that the SIP error message does include a retry-after header (i.e., determination block 512="Yes"), the server may store call setup information in block 514. The call setup information may be information associated with the originally received SIP invite message. In various embodiments, the information associated with the originally received SIP invite message may include SDP information and/or any other information that may enable generation of a new SIP invite message. In various embodiments, the stored information associated with the originally received SIP invite message (i.e., the call setup information) may be information suitable to enable the generation of a new SIP invite message that may achieve setup of the same call attempted with the originally received SIP invite message. In this manner, the stored call setup information may enable the generation of a new SIP invite message that may be a substitute for the originally received SIP invite message.

In determination block 516, the server may determine whether the SIP retry timer is greater than or equal to the retry-after value of default retry-time. In various embodiments, the period of time before sending a new SIP invite message may correspond to a retry time defined at the computing device receiving the SIP error response, i.e., a default retry-time. The default retry-time may be a configurable value and the default retry-time may be independent of the retry-after value. In various embodiments, the default retry-time may be a period of seconds, such as ten seconds. In various embodiments, the retry-after value may be greater than the default retry-time and the server may compare the shorter of the two times to the SIP retry timer to determine whether the SIP retry timer is greater than or equal to the retry-after value of default retry-time. In response to determining that the SIP retry timer is less than the retry-after value of default retry-time (i.e., determination block 516="No"), the server may continue to determine whether the SIP retry timer is greater than or equal to the retry-after value of default retry-time in determination block 516. In this manner, the server may wait the period of time corresponding to the retry-after value or the default retry-time.

In response to determining that the SIP retry timer is greater than or equal to the retry-after value of default retry-time (i.e., determination block 516="Yes"), the server may generate a new SIP invite based at least in part on the stored call setup information in block 518. In this manner, the new SIP invite message may be similar to the originally received SIP invite received in block 502 and the new SIP invite message may be suitable to reattempt initiation of the call.

In block 520 the server may send the new SIP invite message. In various embodiments, the new SIP invite message may be sent to the same computing device to which the original SIP invite message was sent in block 506. For example, a P-CSCF server 110 may send the new SIP invite message to a connected I/S-CSCF server 112. As another example, an I/S-CSCF server 112 may send the new SIP invite message to a connected TAS 114. As a further example, a TAS 114 may send the new SIP invite message to a TAS 114 of another IMS based telecommunication network 109 to which the terminating computing device, such as computing device 104, is connected. Thus, in the various embodiments, though an error message was originally received from that computing device, call setup may be retried with that computing device using the new SIP message. In block 522 the server may reset the SIP retry timer.

In determination block 524, the server may determine whether a SIP error message is received. The operations of determination block 524 may be similar to the operations of determination block 508 described above. SIP error messages may be generated and sent by computing devices in response to network errors occurring preventing call setup. For example, SIP error messages may be generated and sent according to the operations of method 400 described with reference to FIG. 4. In response to determining that no SIP error is received (i.e., determination block 524="No"), the server may continue SIP call setup in block 526. In this manner, the call setup may continue based on the new SIP invite message without the attempted call actually being terminated.

In response to determining that a SIP error message is received (i.e., determination block 524="Yes"), as discussed above, in block 528 the server may send the SIP error to the next computing device, such as the computing device that sent the originally received SIP invite received in block 502. In block 530 the server may reset the SIP retry timer. In this manner, when retry is unsuccessful and results in a further the SIP error message, the call may be terminated.

Figure 5B:
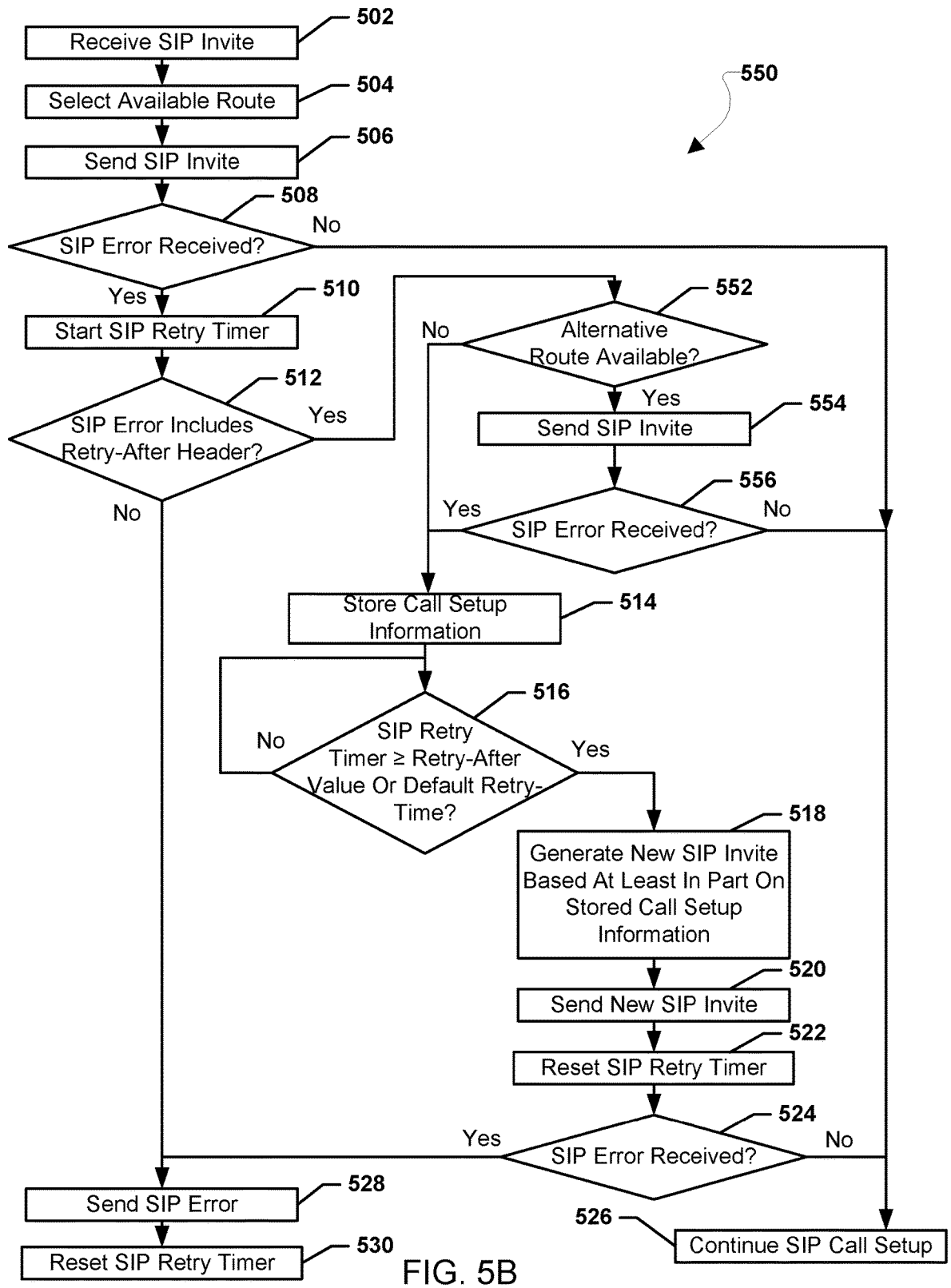
FIG. 5B is a process flow diagram illustrating another embodiment method for automatically retrying IMS based SIP call setup.

FIG. 5B is a process flow diagram illustrating another embodiment method for automatically retrying IMS based SIP call setup. In various embodiments, the operations of method 550 may be performed by a processor of a server in an IMS based telecommunication network 109, such as a P-CSCF server 110, an I/S-CSCF server 112, and/or a TAS 114. In various embodiments, the operations of method 550 may be performed in conjunction with the operations of method 400 (FIG. 4).

With reference t FIGS. 1-5B, in blocks 502, 504, 506, 508, 510, and 512 the server may perform like operations of like numbered blocks of method 500 (FIG. 5A) described above.

In response to determining that the SIP error includes a retry-after header (i.e., determination block 512="Yes"), the server may determine whether alternate routes are available in determination block 552. In an IMS based telecommunication network 109, there may be many different routing paths from a computing device receiving a SIP invite to the next computing device to which the SIP invite may be sent and/or there may be different routing paths to alternative next computing devices to which the SIP invite may be sent. An alternate route may be another available routing path to the next computing device and/or to an alternate next computing device (e.g., a second TAS 114) to which the SIP invite may be sent different from the routing path used in block 506 to send the SIP invite. In response to determining that there are not alternate routes available (i.e., determination block 552="No"), the server may proceed to block 514 to store call setup information.

In response to determining that an alternate route is available (i.e., determination block 552="Yes"), the server may send the originally received SIP invite message along the alternate route in block 554. In determination block 556, the server may determine whether a SIP error message is received. The operations of determination block 556 may be similar to the operations of determination block 508 described above. SIP error messages may be generated and sent by computing devices in response to network errors occurring preventing call setup. For example, SIP error messages may be generated and sent according to the operations of method 400 described with reference to FIG. 4. In response to determining that no SIP error is received (i.e., determination block 556="No"), the server may continue SIP call setup in block 526. In this manner, the call setup may continue using the alternate route without the attempted call actually being terminated.

In response to determining that a SIP error message is received (i.e., determination block 556="Yes"), the server may proceed to block 514 to store call setup information. In blocks 516, 518, 520, 522, 524, 526, 528, and 530 the server may perform like operations of like numbered blocks of method 500 (FIG. 5A) described above.

Figure 6:
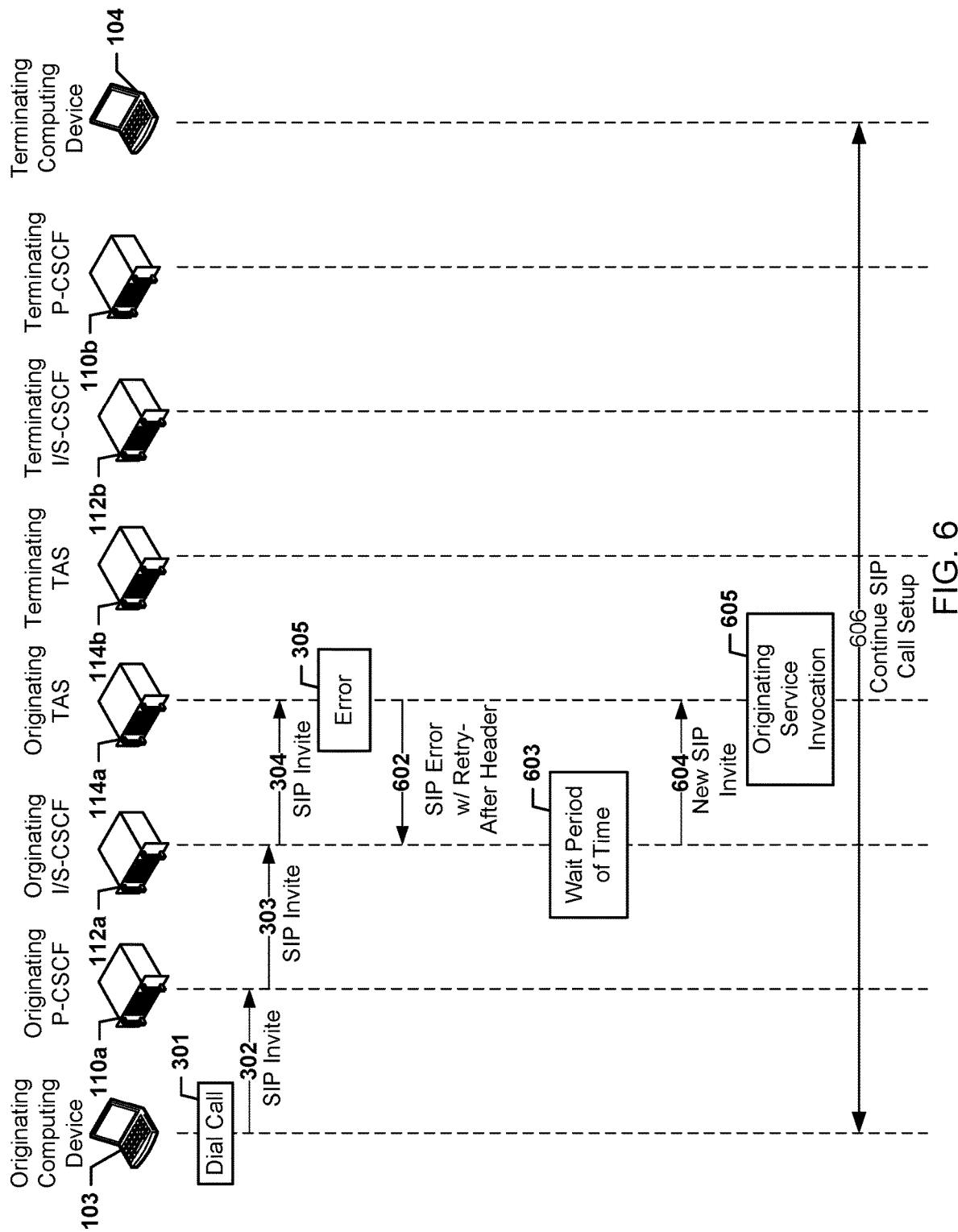
FIG. 6 is a call flow diagram illustrating interactions for attempting SIP call setup in an IP network according to various embodiments.

FIG. 6 is a call flow diagram illustrating interactions for attempting SIP call setup in an IP network according to various embodiments. The example SIP call setup illustrated in FIG. 6 may be to attempt a call from computing device 103 as the originating computing device (i.e., the dialing device) to computing device 104 as the terminating computing device (i.e., the called device). The operations illustrated in FIG. 6 may be performed according to methods 400 (FIG. 4), 500 (FIG. 5A), and/or 550 (FIG. 5B). With reference to FIGS. 1-6, an originating computing device 103 may dial a call, such as in response to a user 102 interaction with the computing device 103 (e.g., a user 102 placing a VOIP call through a VOIP application running on a processor of the computing device 103), in operation 301. The computing device 103 may generate and send a SIP invite message to the P-CSCF 110a in the IMS based telecommunication network 109a to which the computing device 103 is connected in operation 302. The P-CSCF 110a may send the SIP invite message to the I/S-CSCF 112a in operation 303. The I/S-CSCF may send the SIP invite message to the TAS 114a in operation 304. The TAS 114a may determine that a network error occurred at operation 305 preventing the TAS 114a from continuing SIP call setup with the TAS 114b of the IMS based telecommunication network 109b to which the terminating computing device 104 is connected. The error may be any type of network error, such as the network being busy, a server error, a service unavailability, a declined invite, etc.

In response to determining the error occurred, the TAS 114a may send a SIP error message with a retry-after header to the I/S-CSCF 112a in operation 602. In response to receiving the SIP error message with the retry-after header, the I/S-CSCF 112a may wait a period of time in operation 603. The period of time may correspond to a retry-after value in the retry-after header of the SIP error message. In this manner, rather than notifying the originating P-CSCF 110a of the error, the I/S-CSCF 112a may wait to attempt retry and may prevent termination of the call in response to the initial SIP error message from the TAS 114a. In operation 604 the I/S-CSCF 112a may generate a new SIP invite message and send the new SIP invite message to the TAS 114a. No network error may occur when the new SIP invite is sent, and in operation 605 the TAS 114a may invoke the originating service and call setup may continue in operation 606.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500, and 550 may be substituted for or combined with one or more operations of the methods 400, 500, and 550, and vice versa.

Figure 7:
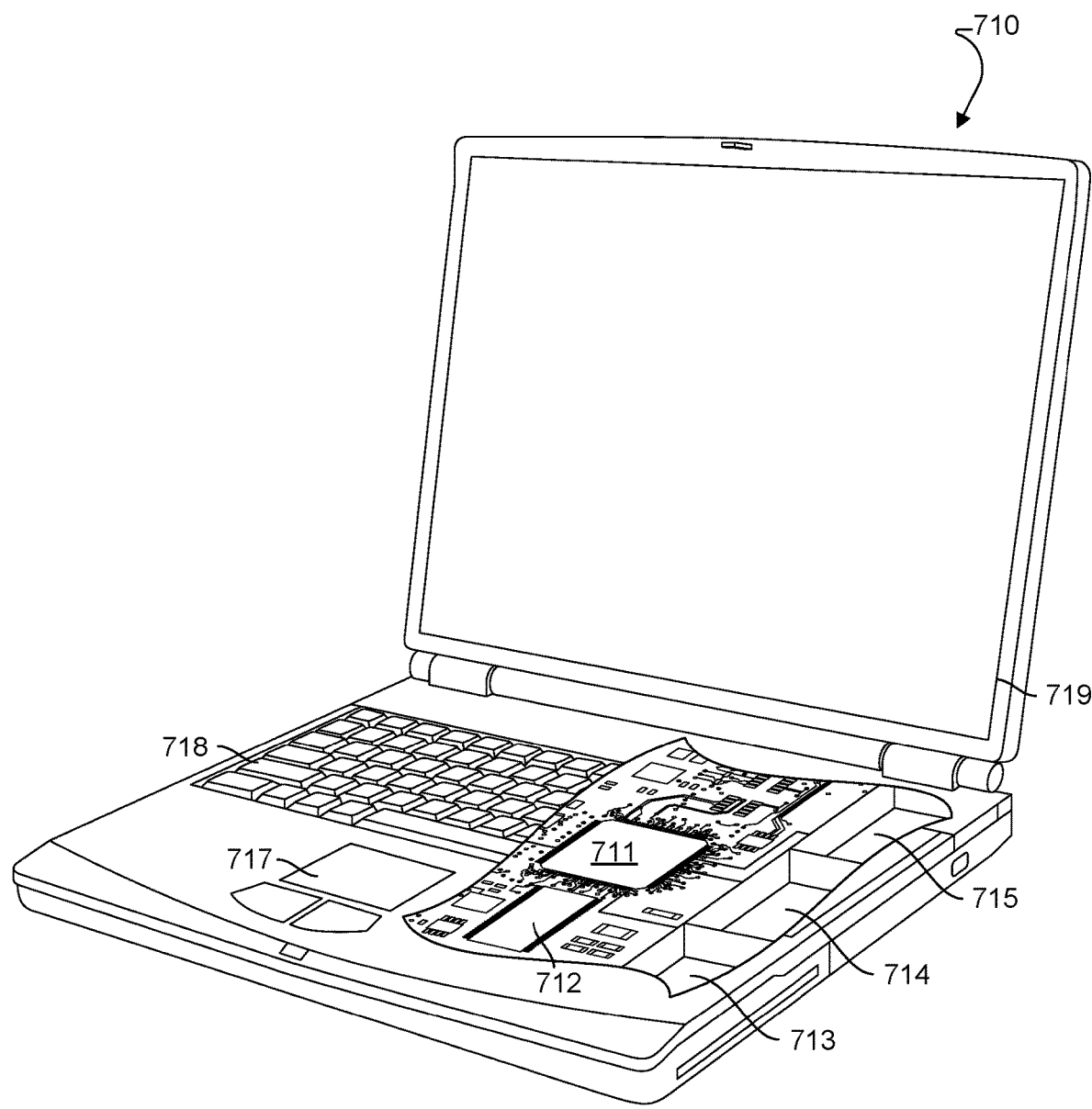
FIG. 7 is a component diagram of an example computing device suitable for use with various embodiments.

The various embodiments (including, but not limited to, embodiments discussed above with reference to FIGS. 1-6) described above may also be implemented within a variety of computing devices, such as a laptop computer 710 as illustrated in FIG. 7. Many laptop computers include a touch pad touch surface 717 that serves as the computer's pointing device, and thus may receive drag, scroll, and flick gestures similar to those implemented on mobile computing devices equipped with a touch screen display and described above. A laptop computer 710 will typically include a processor 711 coupled to volatile memory 712 and a large capacity nonvolatile memory, such as a disk drive 713 of Flash memory. The laptop computer 710 may also include a floppy disc drive 714 and a compact disc (CD) drive 715 coupled to the processor 711. The laptop computer 710 may also include a number of connector ports coupled to the processor 711 for establishing data connections or receiving external memory devices, such as a USB or FireWire® connector sockets, or other network connection circuits (e.g., interfaces) for coupling the processor 711 to a network. In a notebook configuration, the computer housing may include the touchpad 717, the keyboard 718, and the display 719 all coupled to the processor 711. Other configurations of the computing device may include a computer mouse or trackball coupled to the processor (e.g., via a USB input) as are well known, which may also be used in conjunction with the various embodiments.

Figure 8:
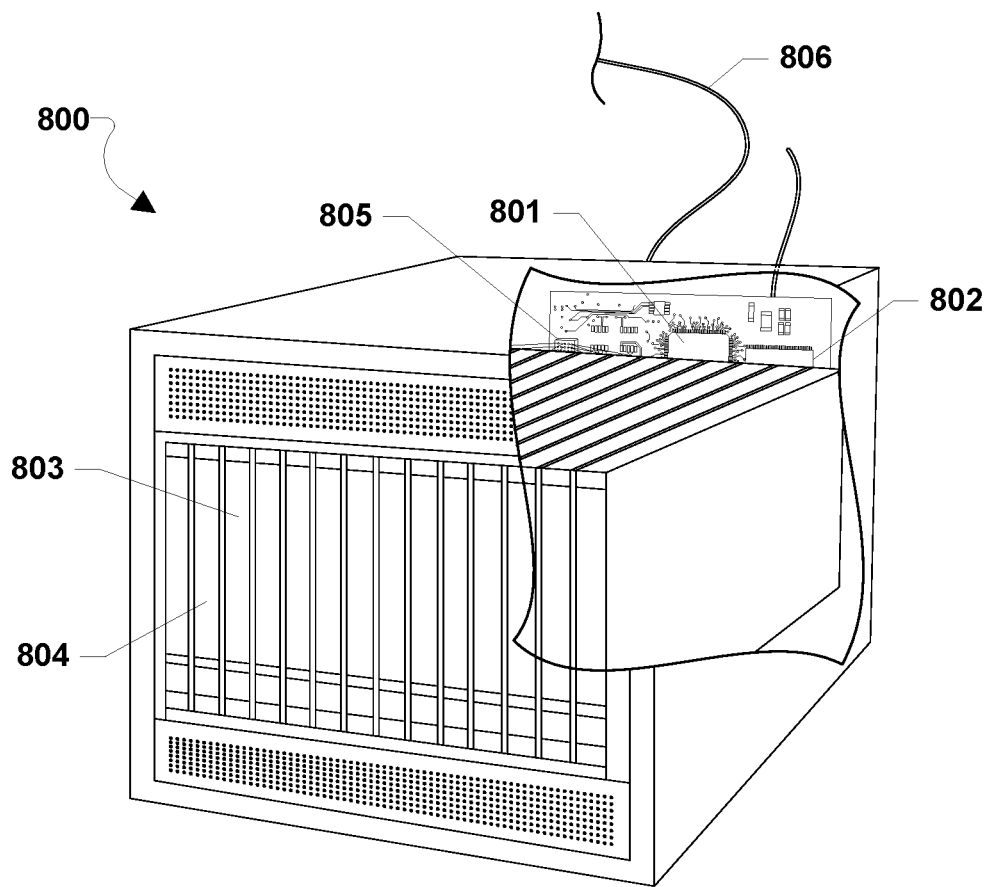
FIG. 8 is a component diagram of an example server suitable for use with the various embodiments.

Various embodiments (including, but not limited to, embodiments discussed above with reference to FIGS. 1-6) may be implemented on any of a variety of commercially available server devices, such as the server device 800 illustrated in FIG. 8. Such a server device 800 may include a processor 801 coupled to volatile memory 802 and a large capacity nonvolatile memory, such as a disk drive 803. The server device 800 may also include a floppy disc drive, compact disc (CD) or DVD disc drive 804 coupled to the processor 801. The server device 800 may also include network access ports 806 coupled to the processor 801 for establishing data connections with a network connection circuit 805 and a communication network (e.g., IP network) coupled to other communication system network elements.

The processors 711, 801 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 711, 801. The processors 711, 801 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 711, 801 including internal memory or removable memory plugged into the device and memory within the processors 711, 801 themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method to automatically retry Session Initiation Protocol (SIP) call setup in an Internet Protocol (IP) Multimedia Subsystem (IMS) based telecommunication network, comprising:

sending, from an interrogating/serving-call session control function server of the IMS based telecommunication network, a SIP invite message generated by a call originating computing device to a telephony application server;

receiving, at the interrogating/serving-call session control function server, a first SIP error message from the telephony application server including a retry-after header indicating a retry-after value;

determining, by the interrogating/serving-call session control function server, whether alternative routes by which to send the SIP invite message are available in response to receiving the first SIP error message from the telephony application server including the retry-after header indicating the retry-after value;

storing, by the interrogating/serving-call session control function server, information associated with the SIP invite message in a memory in response to determining that the alternative routes by which to send the SIP invite message are not available or in response to receiving a second SIP error message;

determining, by the interrogating/serving-call session control function server, whether a SIP retry timer is greater than or equal to the retry-after value in response to storing the information associated with the SIP invite message in the memory;

generating, by the interrogating/serving-call session control function server, a new SIP invite message based at least in part on the information associated with the SIP invite message in the memory in response to determining the SIP retry timer is greater than or equal to the retry-after value;

sending, from the interrogating/serving-call session control function server, the new SIP invite message to the telephony application server; and continuing call setup with the telephony application server in response to sending the new SIP invite message.

2. The method of claim 1, wherein the information associated with the SIP invite message includes Session Description Protocol information.

3. The method of claim 1, wherein the retry-after value is a period of seconds.

4. The method of claim 3, wherein the period of seconds is from 1 second to 65535 seconds.

5. The method of claim 3, further comprising blocking, by the interrogating/serving-call session control function server, routing of calls to the telephony application server until determining the SIP retry timer is greater than or equal to the retry-after value.

6. The method of claim 1, further comprising:

sending, from the interrogating/serving-call session control function server, the SIP invite message to an alternate computing device in response to determining that the alternative routes by which to send the SIP invite message are available.

7. The method of claim 6, further comprising receiving, at the interrogating/serving-call session control function server, the second SIP error message from the alternate computing device, wherein storing, by the interrogating/serving-call session control function server, the information associated with the SIP invite message in the memory in response to determining that the alternative routes by which to send the SIP invite message are not available or in response to receiving the second SIP error message comprises storing, by the interrogating/serving-call session control function server, the information associated with the SIP invite message in the memory in response to receiving the second SIP error message.

8. The method of claim 1, further comprising determining, by the interrogating/serving-call session control function server, whether the SIP retry timer is greater than or equal to a default retry-time in response to storing the information associated with the SIP invite message in the memory, wherein generating, by the interrogating/serving-call session control function server, the new SIP invite message based at least in part on the information associated with the SIP invite message in the memory in response to determining the SIP retry timer is greater than or equal to the retry-after value comprises generating, by the interrogating/serving-call session control function server, the new SIP invite message based at least in part on the information associated with the SIP invite message in the memory in response to determining the SIP retry timer is greater than or equal to the retry-after value or the SIP retry time is greater than or equal to the default retry-time.

9. The method of claim 8, wherein the default retry-time is 10 seconds.

10. The method of claim 1, wherein the IMS based telecommunication network is a fixed line IMS based telecommunication network, a Voice Over Wi-Fi network, or a Voice Over Long-Term Evolution network.

11. An interrogating/serving-call session control function server of an Internet Protocol (IP) Multimedia Subsystem (IMS) based telecommunication network, comprising:

a network interface;
a memory storage; and
a processor coupled to the network interface and memory storage, wherein the processor is configured with processor-executable instructions to:

send via the network interface a Session Initiation Protocol (SIP) invite message generated by a call originating computing device to a telephony application server;

receive via the network interface a first SIP error message from the telephony application server including a retry-after header indicating a retry-after value;

determine whether alternative routes by which to send the SIP invite message are available in response to receiving the first SIP error message from the telephony application server including the retry-after header indicating the retry-after value;

store information associated with the SIP invite message in the memory storage in response to determining that the alternative routes by which to send the SIP invite message are not available or in response to receiving a second SIP error message;

determine whether a SIP retry timer is greater than or equal to the retry-after value in response to storing the information associated with the SIP invite message in the memory storage;

generate a new SIP invite message based at least in part on the information associated with the SIP invite message in the memory storage in response to determining the SIP retry timer is greater than or equal to the retry-after value;

send via the network interface the new SIP invite message to the telephony application server; and continue call setup with the telephony application server in response to sending the new SIP invite message.

12. The interrogating/serving-call session control function server of claim 11, wherein the information associated with the SIP invite message includes Session Description Protocol information.

13. The interrogating/serving-call session control function server of claim 11, wherein the retry-after value is a period of seconds.

14. The interrogating/serving-call session control function server of claim 13, wherein the period of seconds is from 1 second to 65535 seconds.

15. The interrogating/serving-call session control function server of claim 13, wherein the processor is further configured with processor executable instructions to block routing of calls to the telephony application server until determining the SIP retry timer is greater than or equal to the retry-after value.

16. The interrogating/serving-call session control function server of claim 11, wherein the processor is further configured with processor executable instructions to:

send via the network interface the SIP invite message to an alternate computing device in response to determining that the alternative routes by which to send the SIP invite message are available.

17. The interrogating/serving-call session control function server of claim 16, wherein the processor is further configured with processor executable instructions to receive via the network interface the second SIP error message from the alternate computing device, wherein the processor is configured with processor-executable instructions to store the information associated with the SIP invite message in the memory storage in response to determining that the alternative routes by which to send the SIP invite message are not available or in response to receiving the second SIP error message by storing the information associated with the SIP invite message in the memory storage in response to receiving the second SIP error message.

18. The interrogating/serving-call session control function server of claim 11, wherein the processor is further configured with processor executable instructions to determine whether the SIP retry timer is greater than or equal to a default retry-time in response to storing the information associated with the SIP invite message in the memory storage,
wherein the processor is configured with processor-executable instruction to generate the new SIP invite message based at least in part on the information associated with the SIP invite message in the memory storage in response to determining the SIP retry timer is greater than or equal to the retry-after value by generating the new SIP invite message based at least in part on the information associated with the SIP invite message in the memory storage in response to determining the SIP retry timer is greater than or equal to the retry-after value or the SIP retry time is greater than or equal to the default retry-time.

19. The interrogating/serving-call session control function server of claim 18, wherein the default retry-time is 10 seconds.

20. The interrogating/serving-call session control function server of claim 11, wherein the IMS based telecommunication network is a fixed line IMS based telecommunication network, a Voice Over Wi-Fi network, or a Voice Over Long-Term Evolution network.

21. A non-transitory processor-readable storage medium having stored thereon processor-executable instructions configured to cause a processor of an interrogating/serving-call session control function server of an Internet Protocol (IP) Multimedia Subsystem (IMS) based telecommunication network to perform operations comprising:
sending a Session Initiation Protocol (SIP) invite message generated by a call originating computing device to a telephony application server;
receiving a first SIP error message from the telephony application server including a retry-after header indicating a retry-after value;
determining whether alternative routes by which to send the SIP invite message are available in response to receiving the first SIP error message from the telephony application server including the retry-after header indicating the retry-after value;
storing information associated with the SIP invite message in a memory in response to determining that the alternative routes by which to send the SIP invite message are not available or in response to receiving a second SIP error message;
determining whether a SIP retry timer is greater than or equal to the retry-after value in response to storing the information associated with the SIP invite message in the memory;
generating a new SIP invite message based at least in part on the information associated with the SIP invite message in the memory in response to determining the SIP retry timer is greater than or equal to the retry-after value;
sending the new SIP invite message to the telephony application server; and
continuing call setup with the telephony application server in response to sending the new SIP invite message.

* * * * *